(12) United States Patent
Huang (10) Patent No.: US 10,984,114 B2
(45) Date of Patent: Apr. 20, 2021

(54) DOCUMENT PROCESSING METHOD AND APPARATUS

(71) Applicants: Beijing Kingsoft Office Software, Inc., Beijing (CN); Zhuhai Kingsoft Office Software Co., Ltd., Guangdong (CN); Guangzhou Kingsoft Mobile Technology Co., Ltd., Guangdong (CN)

(72) Inventor: Chuantong Huang, Guangdong (CN)

(73) Assignees: Beijing Kingsoft Office Software, Inc., Beijing (CN); Zhuhai Kingsoft Office Software Co., Ltd., Guandong (CN); Guangzhou Kingsoft Mobile Technology Co., Ltd., Guangdong (CN)

( * ) Notice: Subject to any disclaimer, the term of this patent is extended or adjusted under 35 U.S.C. 154(b) by 302 days.

(21) Appl. No.: 16/066,353

(22) PCT Filed: Oct. 25, 2016

(86) PCT No.: PCT/CN2016/103146
§ 371 (c)(1),
(2) Date: Jun. 27, 2018

(87) PCT Pub. No.: WO2017/113953
PCT Pub. Date: Jul. 6, 2017

(65) Prior Publication Data
US 2019/0012468 A1    Jan. 10, 2019

(30) Foreign Application Priority Data
Dec. 31, 2015 (CN) .......................... 201511034069.7

(51) Int. Cl.
G06F 21/60 (2013.01)
H04L 29/08 (2006.01)
(Continued)

(52) U.S. Cl.
CPC ............ *G06F 21/602* (2013.01); *G06F 16/29* (2019.01); *G06F 16/9035* (2019.01);
(Continued)

(58) Field of Classification Search
CPC ........ G06F 21/602; G06F 21/60; G06F 16/93; G06F 16/9035; G06F 16/29;
(Continued)

(56) References Cited

U.S. PATENT DOCUMENTS 8,388,766 B2    3/2013 Ohashi
10,410,776 B2   9/2019 Mino
(Continued)

FOREIGN PATENT DOCUMENTS

CN    101901194 A    12/2010
CN    102468027 A    5/2012
(Continued)

OTHER PUBLICATIONS

Chuang Wang; Xing Xie; Lee Wang; Yansheng Lu; Wei-Ying Ma; "Detecting geographic locations from web resources"; GIR '05: Proceedings of the 2005 workshop on Geographic information retrieval; Nov. 2005; pp. 17-24 (Year: 2005).*
(Continued)

*Primary Examiner* — Kendall Dolly
*Assistant Examiner* — Courtney D Fields
(74) *Attorney, Agent, or Firm* — Alston & Bird LLP (57) ABSTRACT

A document processing method and apparatus are disclosed in embodiments of the present application. The method includes: obtaining a target geographic location where the first electronic device is currently located, when a predetermined operation for a document is detected; determining whether the target geographic location matches a target password that is used to encrypt the document in advance; and if so, allowing the predetermined operation to be per-
(Continued)

formed on the document; and if not, preventing the predetermined operation from being performed on the document. The apparatus includes an obtaining module, a determining module, and a decision module. In the embodiment of the present application, the document is encrypted and decrypted by using a target password generated based on a geographic location, which ensures the security of password transmission, and improves the security of the use of the document and the convenience of authorization and decryption.

18 Claims, 4 Drawing Sheets

(51) Int. Cl.
G06F 16/93 (2019.01)
G06F 16/9035 (2019.01)
H04L 9/08 (2006.01)
G06F 16/29 (2019.01)
G06F 21/62 (2013.01)
H04L 9/32 (2006.01)
G06F 17/24 (2006.01)

(52) U.S. Cl.
CPC .............. *G06F 16/93* (2019.01); *G06F 21/60* (2013.01); *G06F 21/604* (2013.01); *G06F 21/6209* (2013.01); *H04L 9/0872* (2013.01); *H04L 9/3226* (2013.01); *H04L 67/18* (2013.01); *G06F 2221/2107* (2013.01); *G06F 2221/2111* (2013.01)

(58) Field of Classification Search
CPC .............. G06F 21/604; G06F 21/6209; G06F 2221/2107; G06F 2221/2111; G06F 2221/2149; H04L 67/18; H04L 9/0872; H04L 9/3226
See application file for complete search history.

(56) References Cited

U.S. PATENT DOCUMENTS

| | | | |
|---|---|---|---|
| 2003/0108202 A1 | 6/2003 | Clapper | |
| 2014/0280740 A1* | 9/2014 | Alley | H04L 69/329 709/219 |
| 2016/0179776 A1* | 6/2016 | Bartley | G06F 40/166 715/268 |

FOREIGN PATENT DOCUMENTS

| | | | |
|---|---|---|---|
| CN | 103107887 A | 5/2013 | |
| CN | 103514413 A | 1/2014 | |
| CN | 103874021 A | 6/2014 | |
| CN | 104636645 A | 5/2015 | |
| CN | 104767717 A | 7/2015 | |
| CN | 107004500 A | 8/2017 | |
| JP | H07221751 A | 8/1995 | |
| JP | 2001156766 A | 6/2001 | |
| JP | 2002123172 A | 4/2002 | |
| JP | 2004528739 A | 9/2004 | |
| JP | 2005128965 A | 5/2005 | |
| JP | 2006155283 A | 6/2006 | |
| JP | 2015075980 A | 4/2015 | |
| WO | WO-2006087604 A2 * | 8/2006 | H04L 63/08 |

OTHER PUBLICATIONS

International Search report and Written Opinion for Application No. PCT/CN2016/103146 dated Feb. 6, 2017.

Office Action for Chinese Application No. 201511034069.7 dated Jun. 3, 2019.

Office Action for Japanese Application No. 2018-534158 dated May 14, 2019.

* cited by examiner

Fig. 6

DOCUMENT PROCESSING METHOD AND APPARATUS

The present application claims the priority to a Chinese patent application No. 201511034069.7, filed with the State Intellectual Property Office of the People's Republic of China on Dec. 31, 2015 and entitled "Document Processing Method and Apparatus", which is incorporated herein by reference in its entirety.

TECHNICAL FIELD

The present application relates to the field of computer technology, and in particular, to a document processing method and apparatus.

BACKGROUND

With the development of computers and networks, collaborative office is increasingly common. In the field of collaborative office, enterprises have a strong need for document confidentiality, and therefore there are various encryption methods.

In prior art, the most common approach for document confidentiality is to use an operation password to protect the document. In order to facilitate the operation of a document by a user, it is necessary to transmit the document and the password at the same time, which is complicated. Furthermore, the transmission of the password might not be safe (e.g., the password may be lost), thus there needs to be strict requirements on the security of password transmission. In view of above, this approach is inconvenient.

SUMMARY

Embodiments of the present application aims to provide a document processing method and apparatus, so as to provide the security and convenience of document processing in a collaborative office environment by performing geographic location based encryption and decryption. The solutions are as follows.

In the first aspect, an embodiment of the present application provides a document processing method, which is applicable to a first electronic device. The method includes:

obtaining a target geographic location where the first electronic device is currently located, when a predetermined operation for a document is detected;

determining whether the target geographic location matches a target password that is used to encrypt the document in advance, wherein the target password is a password that is used by a second electronic device storing the document to encrypt the document and used to authorize the processing of the document, the password being generated based on a geographic location where the second electronic device is located; and allowing the predetermined operation to be performed on the document if the target geographic location matches the target password; and preventing the predetermined operation from being performed on the document if the target geographic location does not match the target password.

Preferably, the predetermined operation includes a document opening operation;

the target password is a first preset radius value and a geographic location where the second electronic device is located; and determining whether the target geographic location matches a target password that is used to encrypt the document in advance, includes:

determining a first predetermined region that is centered on the geographic location of the second electronic device which is used to encrypt the document in advance, and has a radius of the first preset radius value; and determining whether the target geographic location is within the first predetermined region.

Preferably, the predetermined operation includes a document editing operation;

the target password is a second preset radius value and a geographic location where the second electronic device is located; and determining whether the target geographic location matches a target password that is used to encrypt the document in advance, includes:

determining a second predetermined region that is centered on the geographic location of the second electronic device which is used to encrypt the document in advance, and has a radius of the second preset radius value; and determining whether the target geographic location is within the second predetermined region.

Preferably, the predetermined operation includes a document opening operation;

the target password is a third predetermined region centered on a geographic location where the second electronic device is located; and determining whether the target geographic location matches a target password that is used to encrypt the document in advance, includes:

determining whether the target geographic location is within the third predetermined region, which is used to encrypt the document in advance and is centered on the geographic location where the second electronic device is located.

Preferably, the predetermined operation includes a document editing operation;

the target password is a fourth predetermined region centered on a geographic location where the second electronic device is located; and determining whether the target geographic location matches a target password that is used to encrypt the document in advance, includes:

determining whether the target geographic location is within the fourth predetermined region, which is used to encrypt the document in advance and is centered on the geographic location where the second electronic device is located.

Preferably, after allowing the predetermined operation to be performed on the document, the method according to the embodiment of the present application further includes:

obtaining a permission for encrypting the document according to a password used in encrypting and writing the target password into the document, wherein the target password is encrypted and written into the document in advance;

obtaining a geographic location based encryption instruction for the predetermined operation for the document;

generating a current target password based on a geographic location where the first electronic device is located; and encrypting the document with the generated current target password, and encrypting and writing the generated current target password into the document.

Preferably, after preventing the predetermined operation from being performed on the document, the method according to the embodiment of the present application further includes:

outputting a prompt message indicating that the target geographic location is not in a geographic region where the processing of the document is authorized and the processing of the document is prevented.

Preferably, obtaining a target geographic location where the first electronic device is currently located, includes:

determining whether the predetermined operation for the document is set to be in a geographic location based restricted status, and if the predetermined operation is set to be in the geographic location based restricted status, determining the geographic location where the first electronic device is currently located.

In the second aspect, an embodiment of the present application provides a document processing apparatus, which is applicable to a first electronic device. The apparatus includes:

an obtaining module, configured for obtaining a target geographic location where the first electronic device is currently located, when a predetermined operation for a document is detected;

a determining module, configured for determining whether the target geographic location matches a target password that is used to encrypt the document in advance, wherein the target password is a password used by a second electronic device storing the document to encrypt the document and used to authorize the processing of the document, the password being generated based on a geographic location where the second electronic device is located; and a decision module, configured for allowing the predetermined operation to be performed on the document if the target geographic location matches the target password; and preventing the predetermined operation from being performed on the document if the target geographic location does not match the target password.

Preferably, the predetermined operation includes a document opening operation;

the target password is a first preset radius value and a geographic location where the second electronic device is located; and the determining module includes:

a first region determining unit, configured for determining a first predetermined region that is centered on the geographic location of the second electronic device which is used to encrypt the document in advance, and has a radius of the first preset radius value; and a first determining unit, configured for determining whether the target geographic location is within the first predetermined region.

Preferably, the predetermined operation includes a document editing operation;

the target password is a second preset radius value and a geographic location where the second electronic device is located; and the determining module includes:

a second region determining unit, configured for determining a second predetermined region that is centered on the geographic location of the second electronic device which is used to encrypt the document in advance, and has a radius of the second preset radius value; and a second determining unit, configured for determining whether the target geographic location is within the second predetermined region.

Preferably, the predetermined operation includes a document opening operation;

the target password includes a first predetermined region centered on a geographic location where the second electronic device is located; and the determining module includes:

a third determining unit, configured for determining whether the target geographic location is within the third predetermined region, which is used to encrypt the document in advance and is centered on the geographic location where the second electronic device is located.

Preferably, the predetermined operation includes a document editing operation;

the target password is a fourth predetermined region centered on a geographic location where the second electronic device is located; and the determining module includes:

a fourth determining unit, configured for determining whether the target geographic location is within the fourth predetermined region, which is used to encrypt the document in advance and is centered on the geographic location where the second electronic device is located.

Preferably, the apparatus further includes:

an encryption permission obtaining module, configured for obtaining a permission for encrypting the document according to a password used in encrypting and writing the target password into the document, after the decision module allows the predetermined operation to be performed on the document, wherein the target password is encrypted and written into the document in advance;

an encryption instruction obtaining module, configured for obtaining a geographic location based encryption instruction for the predetermined operation for the document;

a password generating module, configured for generating a current target password based on a geographic location where the first electronic device is located; and an encryption module, configured for encrypting the document with the generated current target password, and encrypting and writing the generated current target password into the document.

Preferably, the document processing apparatus according to the embodiment of the present application further includes:

an output module, configured for outputting a prompt message indicating that the target geographic location is not in a geographic region where the processing of the document is authorized and the processing of the document is prevented, after the decision module prevents the predetermined operation from being performed on the document.

Preferably, the obtaining module includes:

an obtaining unit, configured for determining whether the predetermined operation for the document is set to be in a geographic location based restricted status, and if the predetermined operation is set to be in the geographic location based restricted status, determining the geographic location where the first electronic device is currently located.

In another aspect, an embodiment of the present disclosure provides an electronic device, including: a housing, a processor, a memory, a circuit board and a power supply circuit, wherein, the circuit board is arranged inside a space enclosed by the housing; the processor and the memory are arranged on the circuit board; the power supply circuit is configured to supply power for various circuits or elements of the electronic device; the memory is configured to store an executable program code; the processor executes the executable program code stored in the memory to perform the document processing method according to the embodiments of the present application.

In another aspect, an embodiment of the present disclosure provides an executable program code, which is executed to implement the document processing method according to the embodiments of the present disclosure.

In another aspect, an embodiment of the present disclosure provides a storage medium for storing an executable program code, which is executed to implement the document processing method according to the embodiments of the present disclosure.

The present discloses a document processing method and apparatus. When encrypting the document, the second electronic device uses a password generated based on the geographic location of the second electronic device as the target password for authorizing the processing of the document. When a predetermined operation is to be performed on the document, a target geographic location where the first electronic device is currently located is obtained; it is determined whether the target geographic location matches the target password that is used to encrypt the document in advance; and if it is determined that the target geographic location matches the target password, the predetermined operation is allowed to be performed on the document. This way, the predetermined operation is allowed to be performed on the document in the geographic location which matches the target password that is used to encrypt the document in advance. At this point, the decryption succeeds, and thus the authorization is successful. The operations are simple and convenient, improving the convenience for authorizing the performing of predetermined operations on the document. If it is determined that the target geographic location does not match the target password, the predetermined operation is prevented from being performed on the document. This way, the predetermined operation is prevented from being performed on the document in the geographic location which does not match the target password that is used to encrypt the document in advance. At this point, the decryption is failed, the document is protected. It can be seen, in this solution, the document is encrypted and decrypted based on the geographic location. Therefore, when the document is shared, it is unnecessary to transmit the password and the document simultaneously, reducing the complexity of operations. Further, in the solution, the password is not required to be transmitted, since the user in the authorized region is allowed to access the document, while the user outside the authorized region is not allowed to access the document. This avoids insecurity caused by insecure password transmission. Therefore, with this solution, the security and convenience of the document processing in the collaborative office environment can be ensured.

It should be understood that any product or method for implementing the present disclosure are not required to have all of the advantages described above.

BRIEF DESCRIPTION OF THE DRAWINGS

In order to more clearly describe the technical solutions of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

The technical solution of the application will be described in detail with reference to the drawings of embodiments of the present application. Obviously, the embodiments described are only some, and not all, of the embodiments of the present application. All other embodiments obtained by those of ordinary skills in the art based on the embodiments herein without any creative efforts are within the protection scope of the embodiments of the present application.

In order to solve the existing technical problems, embodiments of the present application provide a document processing method and apparatus, which are capable of providing the security and convenience of document processing in a collaborative office environment by performing geographic location based encryption and decryption. Of course, the document processing method and apparatus according to the embodiments of the present application can be used in other scenarios where access is determined based on regions.

A document processing method according to an embodiment of the present application will be described below.

It should be noted that the document processing method according to the embodiments of the present application is applied to a first electronic device. In practice, the first electronic device can be a smart phone, a tablet computer, a laptop, or the like. These are reasonable.

When used in an electronic device, the documents involved in the embodiments of the present application are compatible with other documents of the same type.

It can be understood that the document processing method according to the embodiments of the present application may be implemented as separate office software, or as a plug-in for existing office software, such as a plug-in for WPS or for Office, and so on. In addition, the "first" in the "first electronic device" and the "second" in the "second electronic device" mentioned hereinafter are not used to limit the electronic devices, only for distinguishing the electronic device decrypting documents and the electronic device encrypting documents from their names. Moreover, the electronic device decrypting documents and the electronic device encrypting documents may be or may not be a same electronic device. The same electronic device may refer to the same electronic device or may refer to two electronic devices of the same type.

Figure 1:
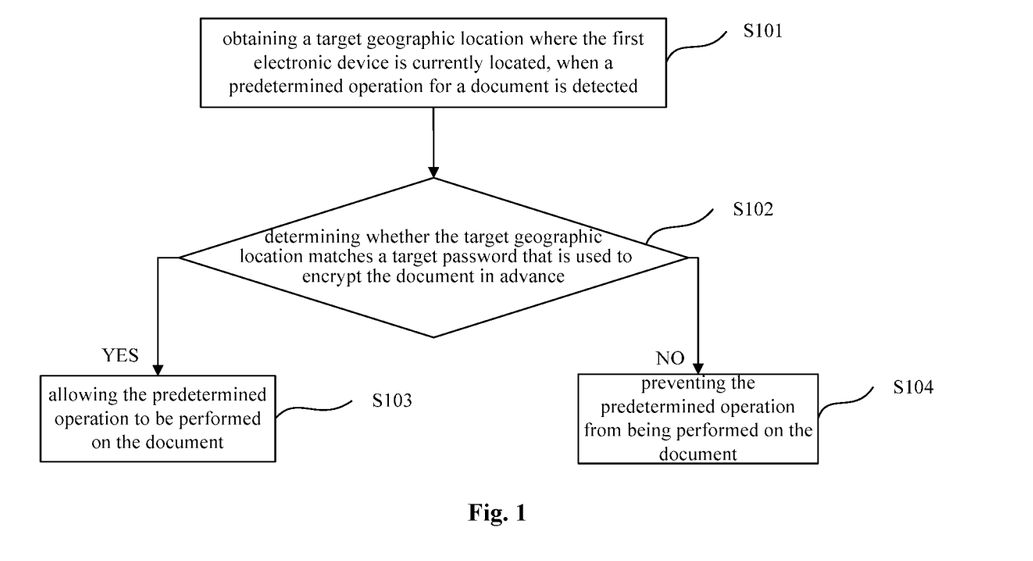
FIG. 1 is a flowchart of a document processing method according to an embodiment of the present application.

FIG. 1 is a flowchart of a document processing method according to an embodiment of the present application. As shown in FIG. 1, the document processing method according to an embodiment of the present application can include S101-S104.

S101, obtaining a target geographic location where a first electronic device is currently located, when a predetermined operation for a document is detected.

In order to authorize a user in the predetermined region to access the document, the document can be encrypted in advance in a second electronic device based on its geographic location. When a user using the first electronic device wishes to process the document, he/she can initiate a predetermined operation for the document. When detecting the predetermined operation for the document, the first electronic device can automatically obtain the target geographic location where it is currently located for a later decryption. It can be understood that the predetermined operation may be a document opening operation or a document editing operation, but it is not limited thereto. For example, the predetermined operation may also be a document content cutting operation, a document content copying operation, or a document content deletion operation.

S102, determining whether the target geographic location matches a target password that is used to encrypt the document in advance, and if so, proceeding to S103, or if not, proceeding to S104.

After the target geographic location where the first electronic device is currently located is obtained, it can be determined whether the target geographic location matches the target password that is used to encrypt the document in advance, and different operations are performed depending on different determination results. The target password is a password used by the second electronic device storing the document to encrypt the document and used to authorize the processing of the document, and the password is generated based on the geographic location where the second electronic device is located.

It should be noted, in the embodiment of the present application, the geographic location where the second electronic device is located is a geographic location where the second electronic device encrypts the document. The second electronic device encrypts the document in advance using the target password. In practice, an encryption instruction can be issued by operating on the document interface, and the second electronic device encrypts the document after receiving the encryption instruction. For example, when encrypting the document via the second electronic device, the user selects a file encryption menu under a document file menu to show an encryption tab with options "Use LBS (Location Based Service) fence technology to restrict opening of files" and "Use LBS fence technology to restrict editing of files"; and checks the option "Use LBS fence technology to restrict opening of files" and/or the option "Use LBS fence technology to restrict editing of files" to issue a geographic location based encryption instruction for a corresponding predetermined operation for the document. In this embodiment, the target password is generated based on the geographic location where the second electronic device encrypts the document. It can be understood, in practice, any specified geographic location may be selected, and a desired target password may be generated based on this geographic location. Said any specified geographic location may be a known geographic location inputted directly, or may be a desired geographic location that is obtained by means of the second electronic device or other auxiliary device.

The target password may be a geographic location and a preset radius value which the generation of that password is based on. Alternatively, the target password may be a specific region centered on the geographic location which the generation of that password is based on, and this specific region can be defined by setting its radius to a value greater than 0 during encryption, as a circular region.

It should be noted, depending on different forms of the target password, there are different specific processes for determining whether the target geographic location matches the target password that is used to encrypt the document in advance. For the purpose of clarity, the detailed implementation process for determining whether the target geographic location matches the target password that is used to encrypt the document in advance will be described later.

S103, allowing the predetermined operation to be performed on the document.

If it is determined that the target geographic location matches the target password that is used to encrypt the document in advance, it indicates that the user using the first electronic device is within the authorized access region, and at this point, the predetermined operation is allowed to be performed on the document.

S104, preventing the predetermined operation from being performed on the document.

If it is determined that the target geographic location does not match the target password that is used to encrypt the document in advance, it indicates that the user using the first electronic device is outside the authorized access region, and at this point, the predetermined operation on the document is prevented for document security.

Moreover, it is allowed to view the information of the geographic location which the generation of the target password is based on. In this case, after viewing the information of the geographic location, the user may readily select an appropriate geographic location where the user is easy to be authorized, so as to be authorized to operate the document.

It should be addressed that the target geographic location where the first electronic device is located is equivalent to the geographic location of the document to be processed, and is also equivalent to the geographic location of the network accessed by the first electronic device. Similarly, the geographic location where the second electronic device is located is equivalent to the geographic location of the document to be processed, and is also equivalent to the geographic location of the network accessed by the second electronic device. Therefore, the target geographic location where the first electronic device is located and the geographic location where the second electronic device is located can be obtained by means of an existing GPS positioning technology, an existing IP positioning technology, or other positioning technologies. The GPS positioning technology is a positioning technology based on GPS (Global Positioning System), and the IP positioning technology is a positioning technology based on the IP address (Internet Protocol Address).

It can be seen, in this solution, the document is encrypted and decrypted based on the geographic location. Therefore, when the document is shared, it is unnecessary to transmit the password and the document simultaneously, reducing the complexity of operations. Further, in the solution, the password is not required to be transmitted, since the user in the authorized region is allowed to access the document, while the user outside the authorized region is not allowed to access the document. This avoids insecurity caused by insecure password transmission. Therefore, with this solution, the security and convenience of the document processing in the collaborative office environment can be ensured.

Specifically, in an implementation, whether the predetermined operation includes a document opening operation or a document editing operation, the target password can include the preset radius value and the geographic location where the second electronic device is located.

Figure 2:
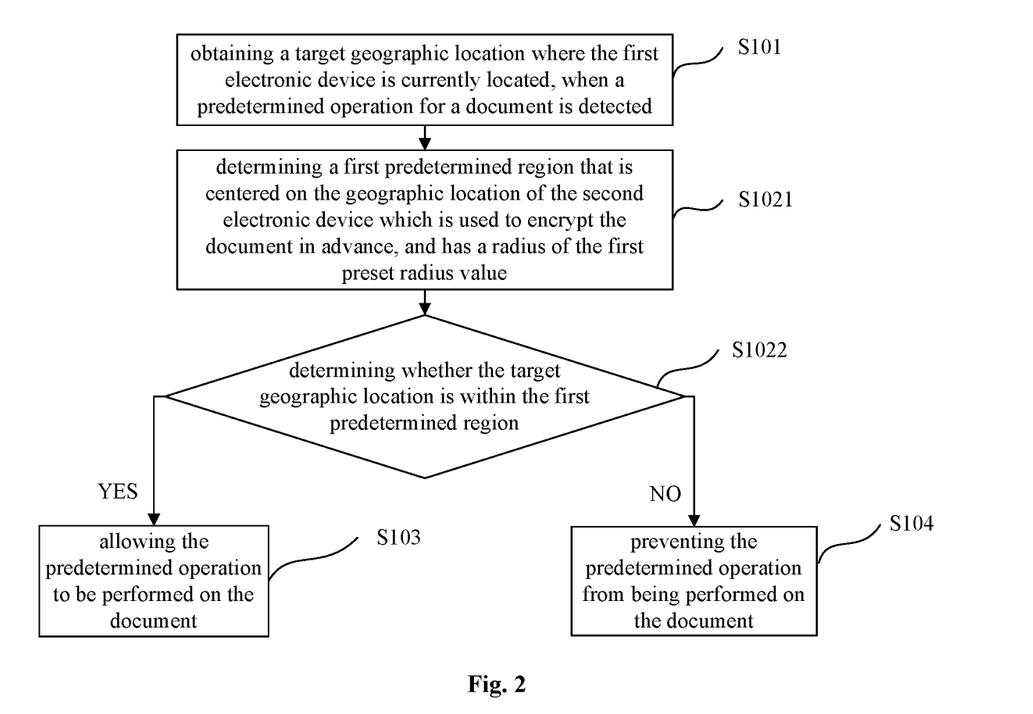
FIG. 2 is another flowchart of a document processing method according to an embodiment of the present application.
Figure 3:
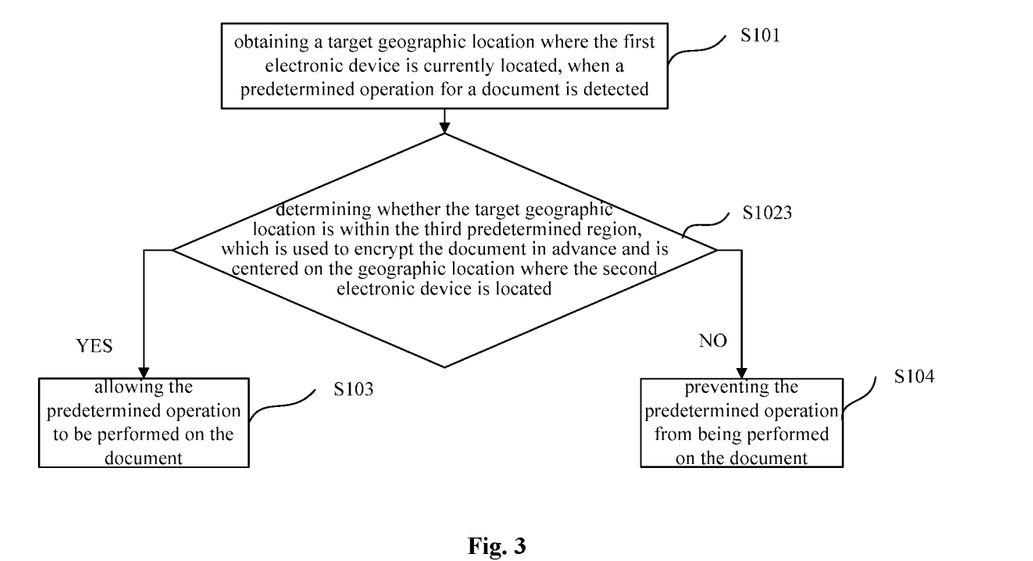
FIG. 3 is another flowchart of a document processing method according to an embodiment of the present application.

In the case where the target password is the preset radius value and the geographic location where the second electronic device is located, when the predetermined operation includes the document opening operation, determining whether the target geographic location matches a target password that is used to encrypt the document in advance in the embodiment of FIG. 1, as shown in FIG. 2, can include:

S1021, determining a first predetermined region, which is centered on the geographic location of the second electronic device which is used to encrypt the document in advance, and has a radius of the first preset radius value.

S1022, determining whether the target geographic location is within the first predetermined region, and if so, proceeding to S103, or if not, proceeding to S104.

The first preset radius value may be specified by the user when encrypting the document via the second electronic device, or may be specified by the system by default. If the first preset radius value is specified by the user, it is necessary to write the preset radius value into the document when the second electronic device encrypts the document.

Similarly, in the case where the target password is the preset radius value and the geographic location where the second electronic device is located, when the predetermined operation includes the document editing operation, determining whether the target geographic location matches a target password that is used to encrypt the document in advance (S102) in the embodiment of FIG. 1, can include:

determining a second predetermined region, which is centered on the geographic location of the second electronic device which is used to encrypt the document in advance and has a radius of the second preset radius value;

determining whether the target geographic location is within the second predetermined region, and if so, allowing the predetermined operation to be performed on the document; or if not, preventing the predetermined operation from being performed on the document.

The radius of the second predetermined region may be specified by the user when encrypting the document via the second electronic device, or may be specified by the system by default. If the radius is specified by the user, it is necessary to write the preset radius value into the document when the second electronic device encrypts the document.

In addition, in such an implementation, one of the document opening operation and the document editing operation may be restricted, or both of them may be restricted. Whether one of the operations or both of them is/are restricted, the sizes of the first predetermined region and the second predetermined region can be set to any value depending on actual conditions. Only one of the two sizes may be stored when they are the same. For example, when both of the operations are restricted, the size of a region, where the document is allowed to be edited, generally must be smaller than the size of a region, where the document is allowed to be opened. Thus, the size of the second predetermined region is smaller than that of the first predetermined region. For example, when the document to be processed is important, if the editing of the document is allowed in only a small region, while only the opening of the document is allowed in a large region where editing is prevented, the size of the second predetermined region may be smaller than that of the first predetermined region.

It should be noted, similar to the above form of the target password, the target password can also be set to a determination threshold and the geographic location of the second electronic device. The specific implementation for determining whether the target geographic location matches a target password that is used to encrypt the document in advance is merely illustrative, and should not be construed as limitation on embodiments of the present application. In the case where the target password is the determination threshold and the geographic location of the second electronic device, the following illustrative implementations are provided.

When the predetermined operation is a document opening operation, determining whether the target geographic location matches a target password that is used to encrypt the document in advance can include:

calculating a distance between the target geographic location and the geographic location of the second electronic device which is used to encrypt the document in advance;

and determining whether the distance is smaller than a first determination threshold, and if so, allowing the predetermined operation to be performed on the document, or if not, preventing the predetermined operation from being performed on the document.

When the predetermined operation is a document editing operation, determining whether the target geographic location matches a target password that is used to encrypt the document in advance can include:

calculating a distance between the target geographic location and the geographic location of the second electronic device which is used to encrypt the document in advance; and determining whether the distance is smaller than a second determination threshold, and if so, allowing the predetermined operation to be performed on the document, or if not, preventing the predetermined operation from being performed on the document.

Similarly, in the case where one of the document opening operation and the document editing operation is restricted, the first determination threshold and the second determination threshold may be set to any value. In the case where both the document opening operation and the document editing operation are restricted, in the above embodiment, the first determination threshold is set to a value greater than that of the second determination threshold. As such, the editing of the document is allowed in only a small region, while only the opening of the document is allowed in a large region where the editing operation is prevented.

Specifically, in another implementation, whether the predetermined operation includes a document opening operation or a document editing operation, the target password can be a certain region centered on the geographical location where the second electronic device is located.

When the predetermined operation includes the document opening operation, the target password may be a third predetermined region centered on the geographical location where the second electronic device is located. The third predetermined region herein can be a circular region determined based on a third preset radius and the geographical location of the second electronic device on which the document is stored; or can be a region with a specific shape, such as a polygonal region, obtained by other means. For example, the polygonal region can be defined by connecting multiple reference points around the geographic location where the second electronic device is located. In this case, determining whether the target geographic location matches a target password that is used to encrypt the document in advance (S102) in the embodiment of FIG. 1, as shown in FIG. 2, can include:

S1023, determining whether the target geographic location is within the third predetermined region, which is used to encrypt the document in advance and is centered on the geographic location where the second electronic device is located, and if so, proceeding to S103, or if not, proceeding to S104.

Similarly, when the predetermined operation includes the document editing operation, the target password can be a fourth predetermined region centered on the geographical location where the second electronic device is located. The fourth predetermined region herein can be a circular region determined based on a fourth preset radius and the geographical location of the second electronic device on which the document is stored; or can be a region with a specific shape, such as a polygonal region, obtained by other means. For example, the polygonal region can be defined by connecting multiple reference points around the geographic location where the second electronic device is located. In this case, determining whether the target geographic location matches a target password that is used to encrypt the document in advance (S102) in the embodiment of FIG. 1, can include:

determining whether the target geographic location is within the fourth predetermined region, which is used to encrypt the document in advance and is centered on the geographic location where the second electronic device is located, and if so, allowing the predetermined operation to be performed on the document, or if not, preventing the predetermined operation from being performed on the document.

It can be understand, in such an implementation, one of the document opening operation and the document editing operation may be restricted, or both of them may be restricted. Whether one of the operations or both of them is/are restricted, the sizes of the third predetermined region and of the fourth predetermined region can be set to any value, depending on specific office requirements. Only one of the two sizes may be stored when they are the same. For example, when both of the operations are restricted, in practice, the size of a region, where the document is allowed to be edited, generally needs to be smaller than the size of a region, where the document is allowed to be opened. Thus, the size of the fourth predetermined region is smaller than that of the third predetermined region. For example, when the document to be processed is important, if the editing of the document is allowed in only a small region, while only the opening of the document is allowed in a large region where editing is prevented, the size of the fourth predetermined region may be smaller than that of the third predetermined region.

Due to the limitations of existing technologies, the geographic location obtained by the existing positioning technologies is not very accurate, and there may be some errors. Therefore, during setting the password, if strict authorization conditions are required, the sizes of the first predetermined region, the second predetermined region, the third predetermined region and the fourth predetermined region, the first determination threshold, and the second determination threshold can be set to values smaller than actually required values; if less strict authorization conditions are required, the sizes of the first predetermined region, the second predetermined region, the third predetermined region and the fourth predetermined region, the first determination threshold, and the second determination threshold can be set to values greater than actually required values.

Figure 4:
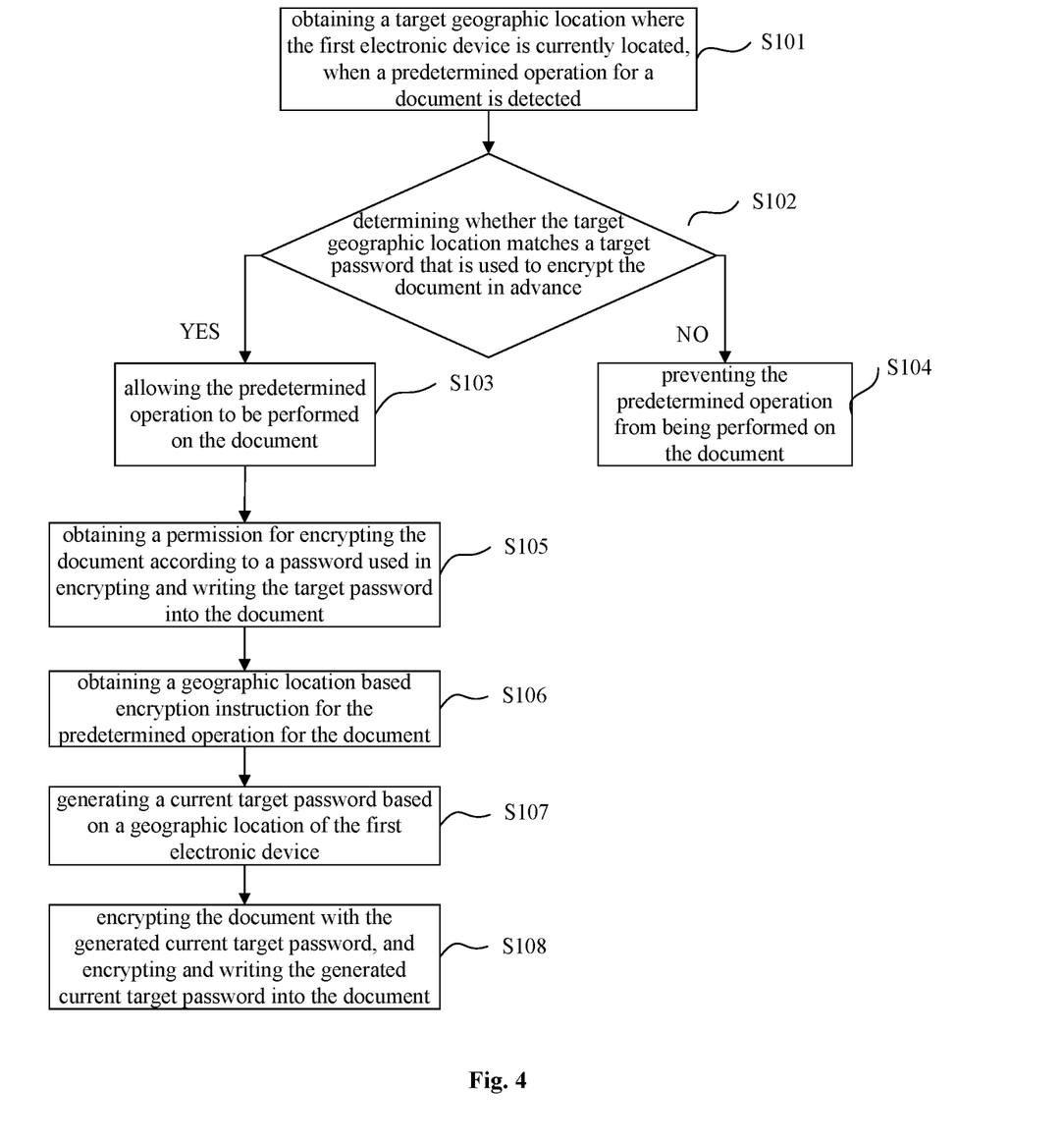
FIG. 4 is another flowchart of a document processing method according to an embodiment of the present application.

In order to further improve the convenience of using documents, some users can be authorized to change the password by encrypting and decrypting the target password. Compared to the embodiment shown in FIG. 1, the document processing method according to the embodiment of the present application, as shown in FIG. 4, can further include:

S105, obtaining a permission for encrypting the document according to a password used in encrypting and writing the target password into the document, wherein the target password is encrypted and written into the document in advance.

S106, obtaining a geographic location based encryption instruction for the predetermined operation for the document.

In practice, an encryption instruction can be issued by operations on the interface of the document. For example, a user may select a file encryption menu under a document file menu to show an encryption tab with options "Use LBS fence technology to restrict opening of files" and "Use LBS fence technology to restrict editing of files"; and check the option "Use LBS fence technology to restrict opening of files" and/or the option "Use LBS fence technology to restrict editing of files" to issue a geographic location based encryption instruction for a corresponding predetermined operation for the document.

S107, generating a current target password based on the geographic location of the first electronic device.

The current target password generated in this step is used as a new target password.

S108, encrypting the document with the generated current target password, and encrypting and writing the generated current target password into the document.

If it is the first time to encrypt the document, S106-S108 can be performed directly.

For the two restricted statuses of "Use LBS fence technology to restrict opening of files" and "Use LBS fence technology to restrict editing of files", a same target password can be set simultaneously, and a same password is used to encrypt the target password; or, different target passwords can be used, and a same password can be used to encrypt the target passwords; or, different target passwords can be used, and different passwords can be respectively used to encrypt the target passwords.

In a specific encryption process, the document has a function of preventing the user from changing the target password if the user does not know the password that is used to encrypt and write the target password into the document. In addition, most of the users in a collaborative office area generally do not need to know the password that is used to encrypt and write the target password into the document. Most employees can open and edit the document as long as the geographic locations of their electronic devices match the target password. In this way, most of the work requirements can be satisfied. Therefore, it is unnecessary to spread the password for encrypting and writing the target password into the document in a wide range, and thus the security of the password can be ensured.

In order to further improve the user experience, after the predetermined operation is prevented from being performed on the document, the document processing method further includes:

outputting a prompt message indicating that the target geographic location is not in a geographic region where the processing of the document is authorized and the processing of the document is prevented.

The prompt message can be, for example, "the target geographic location of the electronic device is not in the LBS fence, and the processing of the document is prevented", or "the target geographic location of the electronic device does not match the target password, and thus the processing of the document is prevented", or "the target geographic location of the electronic device is not in the authorized region, and thus the processing of the document is prevented".

Further, because there are many ways for encrypting documents, in order to improve the efficiency of document processing, obtaining a target geographic location where the first electronic device is currently located can include:

determining whether the predetermined operation for the document is set to be in a geographic location based restricted status, and if so, determining the geographic location where the first electronic device is currently located.

Only when it is determined that the predetermined operation for the document is set to be in a geographic location based restricted status, the step of obtaining a target geographic location where the first electronic device is currently located will be performed, and then the subsequent processes will be started. For example, it is determined that the function of "Use LBS fence technology to restrict opening of files" is set for the document, and/or, it is determined that the function of "Use LBS fence technology to restrict editing of files" is set for the document.

Figure 5:
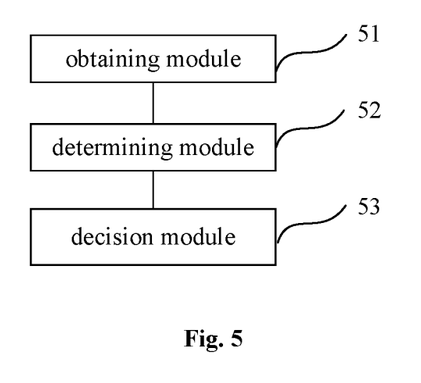
FIG. 5 is a schematic diagram of a structure of a document processing apparatus according to an embodiment of the present application.

Corresponding to the method embodiments described above, an embodiment of the present application provides a document processing apparatus. FIG. 5 is a schematic diagram of a structure of a document processing apparatus according to an embodiment of the present application. As shown in FIG. 5, the present application provides a document processing apparatus, which is applicable to a first electronic device. The apparatus can include:

an obtaining module 51, configured for obtaining a target geographic location where the first electronic device is currently located, when a predetermined operation for a document is detected;

a determining module 52, configured for determining whether the target geographic location matches a target password that is used to encrypt the document in advance, wherein the target password is a password used by a second electronic device storing the document to encrypt the document and used to authorize the processing of the document, the password being generated based on a geographic location where the second electronic device is located; and a decision module 53, configured for allowing the predetermined operation to be performed on the document if the target geographic location matches the target password; and preventing the predetermined operation from being performed on the document if the target geographic location does not match the target password.

It can be seen, in this solution, the document is encrypted and decrypted based on the geographic location. Therefore, when the document is shared, it is unnecessary to transmit the password and the document simultaneously, reducing the complexity of operations. Further, in the solution, the password is not required to be transmitted, since the user in the authorized region is allowed to access the document, while the user outside the authorized region is not allowed to access the document. This avoids insecurity caused by insecure password transmission. Therefore, with this solution, the security and convenience of the document processing in the collaborative office environment can be ensured.

In an embodiment, when the target password is a first preset radius value and a geographic location where the second electronic device is located, and the predetermined operation includes a document opening operation, the determining module 52 includes:

a first region determining unit, configured for determining a first predetermined region that is centered on the geographic location of the second electronic device which is used to encrypt the document in advance, and has a radius of the first preset radius value; and a first determining unit, configured for determining whether the target geographic location is within the first predetermined region.

In another embodiment, the target password is a second preset radius value and a geographic location where the second electronic device is located, the predetermined operation includes a document editing operation, and the determining module 52 includes:

a second region determining unit, configured for determining a second predetermined region that is centered on the geographic location of the second electronic device which is used to encrypt the document in advance, and has a radius of the second preset radius value; and a second determining unit, configured for determining whether the target geographic location is within the second predetermined region.

In an embodiment, the target password is a first determination threshold value and a geographic location where the second electronic device is located, and the determining module 52 includes:

a first calculating unit, configured for calculating a distance between the target geographic location and the geographic location of the second electronic device which is used to encrypt the document in advance; and a first comparing and determining unit, configured for determining whether the distance is smaller than the first determination threshold.

In another embodiment, the target password is a second determination threshold value and a geographic location where the second electronic device is located, and the determining module 52 includes:

a second calculating unit, configured for calculating a distance between the target geographic location and the geographic location of the second electronic device which is used to encrypt the document in advance; and a second comparing and determining unit, configured for determining whether the distance is smaller than the second determination threshold.

In another embodiment, when the predetermined operation includes a document opening operation, and the target password includes a third predetermined region centered on a geographic location where the second electronic device is located, the determining module 52 includes:

a third determining unit, configured for determining whether the target geographic location is within the third predetermined region, which is used to encrypt the document in advance and is centered on the geographic location where the second electronic device is located.

In another embodiment, when the predetermined operation includes a document editing operation, and the target password is a fourth predetermined region centered on a geographic location where the second electronic device is located, the determining module 52 includes:

a fourth determining unit, configured for determining whether the target geographic location is within the fourth predetermined region, which is used to encrypt the document in advance and is centered on the geographic location where the second electronic device is located.

Figure 6:
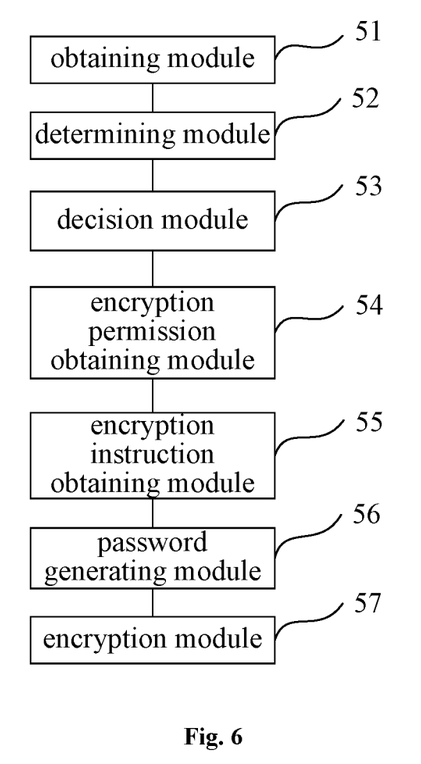
FIG. 6 is a schematic diagram of another structure of a document processing apparatus according to an embodiment of the present application.

Further, FIG. 6 is a schematic diagram of another structure of a document processing apparatus according to an embodiment of the present application. The document processing apparatus according to an embodiment of the present application, as shown in FIG. 6, further includes:

an encryption permission obtaining module 54, configured for obtaining a permission for encrypting the document according to a password used in encrypting and writing the target password into the document, after the decision module allows the predetermined operation to be performed on the document, wherein the target password is encrypted and written into the document in advance;

an encryption instruction obtaining module 55, configured for obtaining a geographic location based encryption instruction for the predetermined operation for the document;

a password generating module 56, configured for generating a current target password based on a geographic location where the first electronic device is located; and an encryption module 57, configured for encrypting the document with the generated current target password, and encrypting and writing the generated current target password into the document.

In the above structure, the document processing apparatus according to the embodiment of the present application further includes:

an output module, configured for outputting a prompt message indicating that the target geographic location is not in a geographic region where the processing of the document is authorized and the processing of the document is prevented, after the decision module prevents the predetermined operation from being performed on the document.

Further, the obtaining module 51 includes an obtaining unit, configured for determining whether the predetermined operation for the document is set to be in a geographic location based restricted status, and if the predetermined operation is set to be in the geographic location based restricted status, determining the geographic location where the first electronic device is currently located.

In another aspect, an embodiment of the present disclosure provides an electronic device, including: a housing, a processor, a memory, a circuit board and a power supply circuit, wherein, the circuit board is arranged inside a space enclosed by the housing; the processor and the memory are arranged on the circuit board; the power supply circuit is configured to supply power for various circuits or elements of the electronic device; the memory is configured to store an executable program code; the processor executes the executable program code stored in the memory to perform the document processing method according to the embodiments of the present application. Specifically, the document processing method includes:

obtaining a target geographic location where the first electronic device is currently located, when a predetermined operation for a document is detected;

determining whether the target geographic location matches a target password that is used to encrypt the document in advance, wherein the target password is a password that is used by a second electronic device storing the document to encrypt the document and used to authorize the processing of the document, the password being generated based on a geographic location where the second electronic device is located; and allowing the predetermined operation to be performed on the document if the target geographic location matches the target password; and preventing the predetermined operation from being performed on the document if the target geographic location does not match the target password.

It can be seen, in this solution, the document is encrypted and decrypted based on the geographic location. Therefore, when the document is shared, it is unnecessary to transmit the password and the document simultaneously, reducing the complexity of operations. Further, in the solution, the password is not required to be transmitted, since the user in the authorized region is allowed to access the document, while the user outside the authorized region is not allowed to access the document. This avoids insecurity caused by insecure password transmission. Therefore, with this solution, the security and convenience of the document processing in the collaborative office environment can be ensured.

In another aspect, an embodiment of the present disclosure provides an executable program code, which is executed to implement the document processing method provided by the embodiments of the present disclosure, wherein the document processing method may include:

obtaining a target geographic location where the first electronic device is currently located, when a predetermined operation for a document is detected;

determining whether the target geographic location matches a target password that is used to encrypt the document in advance, wherein the target password is a password that is used by a second electronic device storing the document to encrypt the document and used to authorize the processing of the document, the password being generated based on a geographic location where the second electronic device is located; and allowing the predetermined operation to be performed on the document if the target geographic location matches the target password; and preventing the predetermined operation from being performed on the document if the target geographic location does not match the target password.

It can be seen, in this solution, the document is encrypted and decrypted based on the geographic location. Therefore, when the document is shared, it is unnecessary to transmit the password and the document simultaneously, reducing the complexity of operations. Further, in the solution, the password is not required to be transmitted, since the user in the authorized region is allowed to access the document, while the user outside the authorized region is not allowed to access the document. This avoids insecurity caused by insecure password transmission. Therefore, with this solution, the security and convenience of the document processing in the collaborative office environment can be ensured.

In another aspect, an embodiment of the present disclosure provides a storage medium for storing an executable program code, which is executed to implement the document processing method provided by the embodiments of the present disclosure, wherein the document processing method may include:

obtaining a target geographic location where the first electronic device is currently located, when a predetermined operation for a document is detected;

determining whether the target geographic location matches a target password that is used to encrypt the document in advance, wherein the target password is a password that is used by a second electronic device storing the document to encrypt the document and used to authorize the processing of the document, the password being generated based on a geographic location where the second electronic device is located; and allowing the predetermined operation to be performed on the document if the target geographic location matches the target password; and preventing the predetermined operation from being performed on the document if the target geographic location does not match the target password.

It can be seen, in this solution, the document is encrypted and decrypted based on the geographic location. Therefore, when the document is shared, it is unnecessary to transmit the password and the document simultaneously, reducing the complexity of operations. Further, in the solution, the password is not required to be transmitted, since the user in the authorized region is allowed to access the document, while the user outside the authorized region is not allowed to access the document. This avoids insecurity caused by insecure password transmission. Therefore, with this solution, the security and convenience of the document processing in the collaborative office environment can be ensured.

It should be noted that the relationship terms herein such as "first", "second" and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by a person skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A document processing method, which is applicable to a first electronic device, comprising:
   obtaining a target geographic location where the first electronic device is currently located, when a predetermined operation for a document is detected;
   determining whether the target geographic location matches a target password that is used to encrypt the document in advance, wherein the target password is a password that is used by a second electronic device storing the document to encrypt the document and used to authorize the processing of the document, the password being generated based on a geographic location where the second electronic device is located; and
   allowing the predetermined operation to be performed on the document if the target geographic location matches the target password; and preventing the predetermined operation from being performed on the document if the target geographic location does not match the target password,
   wherein after allowing the predetermined operation to be performed on the document, the method further comprises:
   obtaining a permission for encrypting the document;
   obtaining a geographic location based encryption instruction for the predetermined operation for the document;
   generating a current target password based on a geographic location where the first electronic device is located; and
   encrypting the document with the generated current target password.

2. The method of claim 1, wherein the predetermined operation comprises a document opening operation;
   the target password is a first preset radius value and a geographic location where the second electronic device is located; and
   determining whether the target geographic location matches a target password that is used to encrypt the document in advance, comprises:
   determining a first predetermined region that is centered on the geographic location of the second electronic device which is used to encrypt the document in advance, and has a radius of the first preset radius value; and
   determining whether the target geographic location is within the first predetermined region.

3. The method of claim 1, wherein the predetermined operation comprises a document editing operation;
   the target password is a second preset radius value and a geographic location where the second electronic device is located; and
   determining whether the target geographic location matches a target password that is used to encrypt the document in advance, comprises:
   determining a second predetermined region that is centered on the geographic location of the second electronic device which is used to encrypt the document in advance, and has a radius of the second preset radius value;
   determining whether the target geographic location is within the second predetermined region.

4. The method of claim 1, wherein the predetermined operation comprises a document opening operation;
   the target password is a third predetermined region centered on a geographic location where the second electronic device is located; and
   determining whether the target geographic location matches a target password that is used to encrypt the document in advance, comprises:
   determining whether the target geographic location is within the third predetermined region, which is used to encrypt the document in advance and is centered on the geographic location where the second electronic device is located.

5. The method of claim 1, wherein the predetermined operation comprises a document editing operation;
   the target password is a fourth predetermined region centered on a geographic location where the second electronic device is located; and
   determining whether the target geographic location matches a target password that is used to encrypt the document in advance, comprises:
   determining whether the target geographic location is within the fourth predetermined region, which is used to encrypt the document in advance and is centered on the geographic location where the second electronic device is located.

6. The method of claim 1, wherein the obtaining the permission for encrypting the document:

obtaining the permission for encrypting the document according to a password used in encrypting and writing the target password into the document, wherein the target password is encrypted and written into the document in advance;

the method further comprises: after encrypting the document with the generated current target password, encrypting and writing the generated current target password into the document.

7. The method of claim 1, wherein after preventing the predetermined operation from being performed on the document, the method further comprises:

outputting a prompt message indicating that the target geographic location is not in a geographic region where the processing of the document is authorized and the processing of the document is prevented.

8. The method of claim 1, wherein obtaining a target geographic location where the first electronic device is currently located, comprises:

determining whether the predetermined operation for the document is set to be in a geographic location based restricted status, and if the predetermined operation is set to be in the geographic location based restricted status, determining the geographic location where the first electronic device is currently located.

9. A document processing apparatus, which is applicable to a first electronic device, comprising:

an obtaining module, configured for obtaining a target geographic location where the first electronic device is currently located, when a predetermined operation for a document is detected;

a determining module, configured for determining whether the target geographic location matches a target password that is used to encrypt the document in advance, wherein the target password is a password used by a second electronic device storing the document to encrypt the document and used to authorize the processing of the document, the password being generated based on a geographic location where the second electronic device is located;

a decision module, configured for allowing the predetermined operation to be performed on the document if the target geographic location matches the target password; and preventing the predetermined operation from being performed on the document if the target geographic location does not match the target password;

an encryption permission obtaining module, configured for obtaining a permission for encrypting the document, after the decision module allows the predetermined operation to be performed on the document;

an encryption instruction obtaining module, configured for obtaining a geographic location based encryption instruction for the predetermined operation for the document;

a password generating module, configured for generating a current target password based on a geographic location where the first electronic device is located; and an encryption module, configured for encrypting the document with the generated current target password.

10. The apparatus of claim 9, wherein the predetermined operation comprises a document opening operation;

the target password is a first preset radius value and a geographic location where the second electronic device is located; and the determining module comprises:

a first region determining unit, configured for determining a first predetermined region that is centered on the geographic location of the second electronic device which is used to encrypt the document in advance, and has a radius of the first preset radius value; and a first determining unit, configured for determining whether the target geographic location is within the first predetermined region.

11. The apparatus of claim 9, wherein the predetermined operation comprises a document editing operation;

the target password is a second preset radius value and a geographic location where the second electronic device is located; and the determining module comprises:

a second region determining unit, configured for determining a second predetermined region that is centered on the geographic location of the second electronic device which is used to encrypt the document in advance, and has a radius of the second preset radius value; and a second determining unit, configured for determining whether the target geographic location is within the second predetermined region.

12. The apparatus of claim 9, wherein the predetermined operation comprises a document opening operation;

the target password comprises a first predetermined region centered on a geographic location where the second electronic device is located; and the determining module comprises:

a third determining unit, configured for determining whether the target geographic location is within the third predetermined region, which is used to encrypt the document in advance and is centered on the geographic location where the second electronic device is located.

13. The apparatus of claim 9, wherein the predetermined operation comprises a document editing operation;

the target password is a fourth predetermined region centered on a geographic location where the second electronic device is located; and the determining module comprises:

a fourth determining unit, configured for determining whether the target geographic location is within the fourth predetermined region, which is used to encrypt the document in advance and is centered on the geographic location where the second electronic device is located.

14. The apparatus of claim 9, wherein, the encryption permission obtaining module is further configured for obtaining the permission for encrypting the document according to a password used in encrypting and writing the target password into the document, after the decision module allows the predetermined operation to be performed on the document, wherein the target password is encrypted and written into the document in advance;

the encryption module is further configured for after encrypting the document with the generated current target password, encrypting and writing the generated current target password into the document.

15. The apparatus of claim 9, further comprising:

an output module, configured for outputting a prompt message indicating that the target geographic location is not in a geographic region where the processing of the document is authorized and the processing of the document is prevented, after the decision module prevents the predetermined operation from being performed on the document.

16. The apparatus of claim 9, wherein the obtaining module further comprises:

an obtaining unit, configured for determining whether the predetermined operation for the document is set to be in a geographic location based restricted status, and if the predetermined operation is set to be in the geographic location based restricted status, determining the geographic location where the first electronic device is currently located.

17. An electronic device, comprising: a housing, a processor, a memory, a circuit board, and a power supply circuit, wherein the circuit board is arranged inside a space enclosed by the housing; the processor and the memory are arranged on the circuit board; the power supply circuit is configured to supply power for various circuits or elements of the electronic device; the memory is configured to store an executable program code; and the processor executes the executable program code stored in the memory to perform:

obtaining a target geographic location where a first electronic device is currently located, when a predetermined operation for a document is detected;

determining whether the target geographic location matches a target password that is used to encrypt the document in advance, wherein the target password is a password that is used by a second electronic device storing the document to encrypt the document and used to authorize the processing of the document, the password being generated based on a geographic location where the second electronic device is located;

allowing the predetermined operation to be performed on the document if the target geographic location matches the target password; and preventing the predetermined operation from being performed on the document if the target geographic location does not match the target password, wherein after allowing the predetermined operation to be performed on the document, the processor executes the executable program code stored in the memory to perform:

obtaining a permission for encrypting the document;

obtaining a geographic location based encryption instruction for the predetermined operation for the document;

generating a current target password based on a geographic location where the first electronic device is located; and encrypting the document with the generated current target password.

18. A non-transitory storage medium having stored therein an executable program code, wherein the executable program code is executed by a processor, so as to cause the processor to perform:

obtaining a target geographic location where a first electronic device is currently located, when a predetermined operation for a document is detected;

determining whether the target geographic location matches a target password that is used to encrypt the document in advance, wherein the target password is a password that is used by a second electronic device storing the document to encrypt the document and used to authorize the processing of the document, the password being generated based on a geographic location where the second electronic device is located;

allowing the predetermined operation to be performed on the document if the target geographic location matches the target password; and preventing the predetermined operation from being performed on the document if the target geographic location does not match the target password, wherein after allowing the predetermined operation to be performed on the document, the executable program code is executed by the processor, so as to cause the processor to perform:

obtaining a permission for encrypting the document;

obtaining a geographic location based encryption instruction for the predetermined operation for the document;

generating a current target password based on a geographic location where the first electronic device is located; and encrypting the document with the generated current target password.

* * * * *